US010014773B2

United States Patent
Dong et al.

(10) Patent No.: US 10,014,773 B2
(45) Date of Patent: Jul. 3, 2018

(54) HYBRID ACTIVE POWER LINK MODULE DEVICE AND ASSOCIATED SYSTEMS AND METHODS

(71) Applicant: General Electric Company, Schenectady, NY (US)

(72) Inventors: Dong Dong, Schenectady, NY (US); Rui Zhou, Niskayuna, NY (US); Zhi Zhou, Selkirk, NY (US); Tomas Sadilek, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 126 days.

(21) Appl. No.: 15/253,124

(22) Filed: Aug. 31, 2016

(65) Prior Publication Data

US 2018/0062514 A1    Mar. 1, 2018

(51) Int. Cl.
*H02M 3/158* (2006.01)
*H02J 7/00* (2006.01)

(52) U.S. Cl.
CPC .......... *H02M 3/158* (2013.01); *H02J 7/0024* (2013.01)

(58) Field of Classification Search
CPC ................................ H02M 3/158; H02J 7/024
See application file for complete search history.

(56) References Cited

U.S. PATENT DOCUMENTS 5,986,909 A    11/1999   Hammond et al.
6,222,284 B1    4/2001   Hammond et al.
7,269,037 B2    9/2007   Marquardt
7,825,540 B2    11/2010  Ogusa et al.
8,922,054 B2    12/2014  Sihler et al.
9,190,932 B2    11/2015  Harnefors et al.
2012/0127766 A1   5/2012  Crookes et al.
2014/0078797 A1   3/2014  Mihalache
2015/0084611 A1   3/2015  Agrawal et al.
2015/0108844 A1   4/2015  Zhou et al.
2015/0130420 A1   5/2015  Fassnacht et al.
2015/0137764 A1   5/2015  Kessler
2015/0155712 A1   6/2015  Mondal
2015/0207434 A1   7/2015  Wang et al.
2015/0336469 A1   11/2015 Ladhari et al.
2016/0020628 A1   1/2016  Guo et al.
2016/0020705 A1   1/2016  Dong et al.

OTHER PUBLICATIONS

International Search Report and Written Opinion issued in connection with corresponding PCT Application No. PCT/US2017/30481, dated Jan. 9, 2018.

*Primary Examiner* — Robert Deberadinis
(74) *Attorney, Agent, or Firm* — GE Global Patent Operation; Nitin Joshi

(57) ABSTRACT

A hybrid active power link device includes a plurality of active power link modules (APLMs). Each APLM of the plurality of APLMs includes a plurality of switching devices including a first switching device and a second switching device coupled in series. Each APLM of the plurality of APLMs also includes at least one first-type energy storage device (ESD) coupled in parallel with both of the first switching device and the second switching device. The hybrid active power link device also includes at least one second-type ESD coupled in series with at least one APLM of the plurality of APLMs.

24 Claims, 7 Drawing Sheets ical power conversion and electrical energy storage systems, and, more specifically, to hybrid active power link devices and associated systems and methods for use in direct current (DC) power systems.

HYBRID ACTIVE POWER LINK MODULE DEVICE AND ASSOCIATED SYSTEMS AND METHODS

STATEMENT REGARDING FEDERALLY SPONSORED RESEARCH & DEVELOPMENT

This invention was made with Government support under contract number N00014-14-C-0103 awarded by the United States Office of Naval Research. The Government may have certain rights in this invention.

BACKGROUND

The field of the disclosure relates generally to electrical power conversion and electrical energy storage systems, and, more specifically, to hybrid active power link devices and associated systems and methods for use in direct current (DC) power systems.

In known DC power conversion systems employing high power density energy storage devices (ESDs) such as ultracapacitors, boost-type DC-to-DC converters are employed. Such known DC power conversion systems require a full power-rated converter with high voltage ESDs to support electrical load devices operating at medium to low voltages. Further, at least some known DC power conversion systems utilize over-sized ESDs for heat management, heavy inductors, and bulky bus capacitors, which increase size and weight, in addition to lowering specific power density.

Also, in at least some known DC power conversion systems, non-modular topologies such as boost-type architectures are limited in attainable switching frequencies and dynamic responsiveness, and also present challenges related to fault isolation and tolerance. In the event of a fault in such known DC power conversion systems, electrical loads supported thereby require shutdown until system repairs are made. Furthermore, in such known systems, charging and discharging ESDs is inconvenient and places supported electrical loads out of service for extended periods of time. Moreover, in at least some known DC power conversion systems, over-rated components present unnecessary cost and complexity in applications requiring only partial control for moderate transient support of electrical load devices.

BRIEF DESCRIPTION

In one aspect, a hybrid active power link device is provided. The hybrid active power link device includes a plurality of active power link modules (APLMs). Each APLM of the plurality of APLMs includes a plurality of switching devices including a first switching device and a second switching device coupled in series. Each APLM of the plurality of APLMs also includes at least one first-type energy storage device (ESD) coupled in parallel with both of the first switching device and the second switching device. The hybrid active power link device also includes at least one second-type ESD coupled in series with at least one APLM of the plurality of APLMs.

In another aspect, a power converter system is provided. The power converter system includes at least one electrical load device, and at least one hybrid active power link device coupled in parallel with the at least one electrical load device. The at least one hybrid active power link device includes a plurality of APLMs. Each APLM of the plurality of APLMs includes a plurality of switching devices including a first switching device and a second switching device coupled in series. Each APLM of the plurality of APLMs also includes at least one first-type ESD coupled in parallel with both of the first switching device and the second switching device. The power converter system also includes at least one second-type ESD coupled in series with at least one APLM of the plurality of APLMs, where the at least one hybrid active power link device is configured to induce a first direct current (DC) voltage.

In yet another aspect, a method of operating a power converter system is provided. The power converter system includes at least one electrical load device coupled to at least one hybrid active power link device including a plurality of ESDs and a plurality of APLMs. The at least one hybrid active power link device is configured to induce a first DC voltage. The at least one electrical load device is further coupled to a power source configured to induce a second DC voltage. The method includes determining an average DC operating voltage of the at least one electrical load device, an average DC current of the at least one electrical load device, an average electrical power rating of the at least one electrical load device, and at least one additional electrical power rating greater than the average electrical power rating. The method also includes supplying the at least one electrical load device with the average DC current at the second DC voltage substantially equal to the average DC operating voltage, where the average DC current provides a first electrical power to the at least one electrical load device substantially equal to the average electrical power rating. The method further includes discharging the plurality of ESDs to supply the at least one electrical load device with a supplemental DC current at a voltage substantially equal to the second DC voltage, where the supplemental DC current and the average DC current, when added together, provide a second electrical power to the at least one electrical load device substantially equal to the at least one additional electrical power rating.

DRAWINGS

These and other features, aspects, and advantages of the present disclosure will become better understood when the following detailed description is read with reference to the accompanying drawings in which like characters represent like parts throughout the drawings, wherein.

Figure 1:
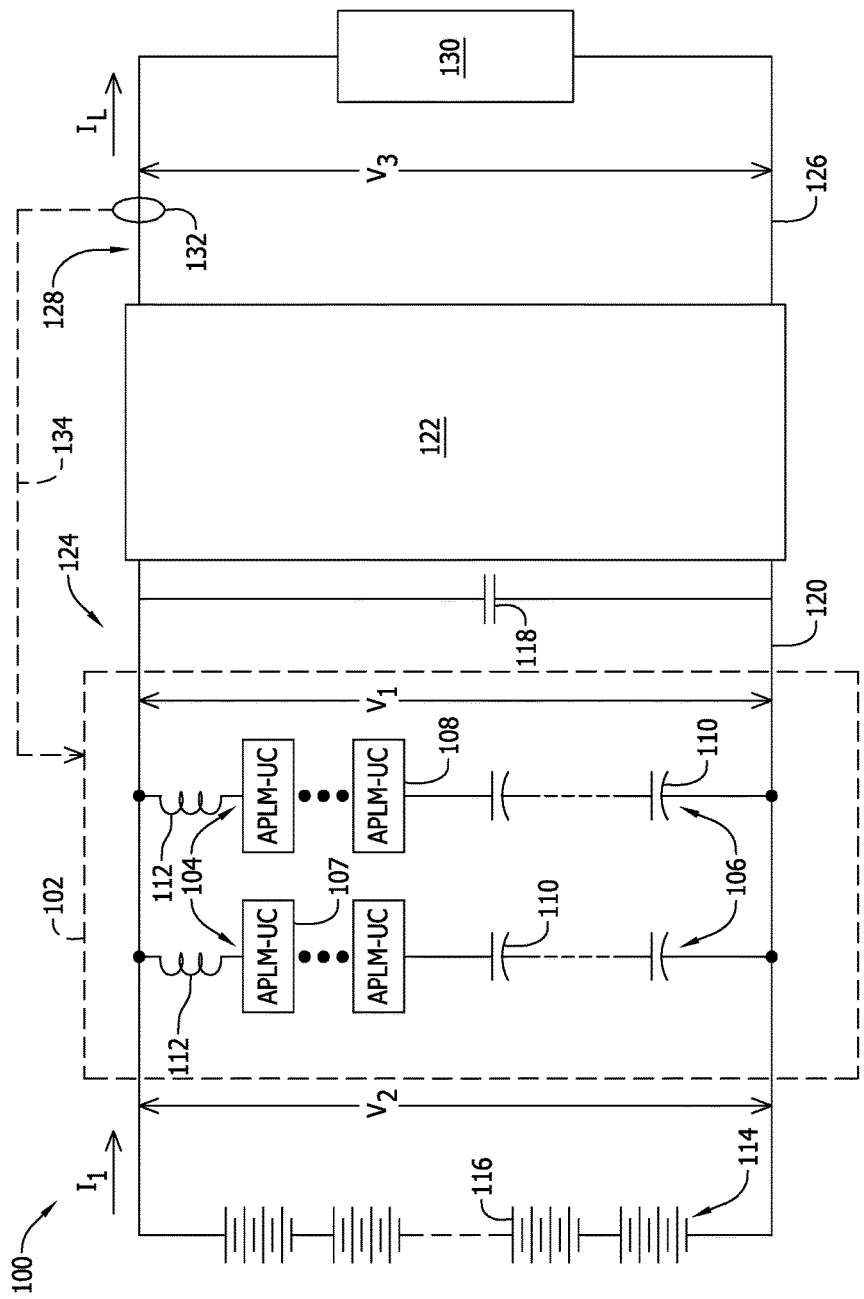
FIG. 1 is a schematic diagram of an exemplary embodiment of a power converter system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The hybrid active power link devices and associated systems and methods described herein enable functional integration of modular multi-level converter (MMC)-like power electronics into energy storage devices (ESDs) such as ultracapacitors for applications in a wide range of DC power system operating voltages. The embodiments described herein also provide a modular, building block-based system which enables scalability and redundancy, and high efficiency and fault tolerant operation in both centralized and distributed power conversion applications. Further, the embodiments described herein facilitate use of simplified control schemes for energy and power management systems (EMS) based on current and power profiles of supported electrical loads. The hybrid active power link devices and associated systems and methods described herein also provide a high efficiency power converter having improved specific power density, less design and development time and expense, and reduced non-recurring engineering (NRE) and other operating costs relative to known systems. The embodiments described herein further enable effective functional integration of numerous ESD types into DC power conversion systems without requiring heavy and bulky inductive and capacitative components. Furthermore, the embodiments described herein provide lower operational and maintenance costs, and enable lower complexity control systems in applications requiring only partial control for moderate transient support of electrical load devices.

FIG. 1 is a schematic diagram of an exemplary embodiment of a power converter system 100. In the exemplary embodiment, power converter system 100 includes at least one hybrid active power link device 102. Hybrid active power link device 102 includes a plurality of active power link modules (APLMs) 104. Each APLM 104 of plurality of APLMs 104 includes a plurality of switching devices and at least one first-type ESD (as shown and described below with reference to FIG. 3). Hybrid active power link device 102 also includes at least one hybrid APLM (H-APLM) string 106. H-APLM string 106 includes at least two APLMs 104 including, without limitation, a first APLM 107 and a second APLM 108 coupled in electrical series. H-APLM string 106 also includes at least one second-type ESD 110 coupled in electrical series with second APLM 108. Second APLM 108 is positioned opposite first APLM 107 in H-APLM string 106 with respect to second-type ESD 110. Second-type ESD 110 is embodied in an ultracapacitor. In other embodiments, not shown, second-type ESD 110 is embodied in an ESD other than an ultracapacitor including, without limitation, at least one of a battery, a film capacitor, an electrolytic capacitor, and a fuel cell. H-APLM string 106 further includes at least one inductor 112 coupled in electrical series with first APLM 107.

Power converter system 100 also includes an ESD string 114 (i.e., a DC power source) coupled in electrical parallel with hybrid active power link device 102. ESD string 114 includes at least one third-type ESD 116. In the exemplary embodiment, ESD string 114 includes a plurality of third-type ESDs 116 coupled to each other in electrical series. Third-type ESD 116 is embodied in a battery. In other embodiments, not shown, third-type ESD 116 is embodied in an ESD other than a battery including, without limitation, at least one of an ultracapacitor, a film capacitor, an electrolytic capacitor, and a fuel cell. In still other embodiments, not shown, ESD string 114 is embodied in a plurality of ESD strings 114 coupled to each other in electrical parallel. In yet other embodiments, not shown, ESD string 114 is embodied in an alternating current (AC)-to-DC converter configured to convert an AC power source (e.g., from a utility grid) to DC power suitable for use in power converter system 100.

Power converter system 100 further includes at least one filter capacitor 118 coupled in electrical parallel with both of hybrid active power link device 102 and ESD string 114. Also, in the exemplary embodiment, ESD string 114, hybrid active power link device 102, and filter capacitor 118 together form a first DC bus 120. First DC bus 120 is coupled to a DC-to-DC converter 122 at a first side 124 thereof. A second DC bus 126 is coupled to a second side 128 of DC-to-DC converter 122. Power converter system 100 also includes at least one electrical load device 130 coupled in electrical parallel to second DC bus 126.

In operation, in the exemplary embodiment, hybrid active power link device 102 is configured to induce a first DC voltage (i.e., $V_1$) and ESD string 114 with at least one third-type ESD 116 is configured to induce a second DC voltage (i.e., $V_2$). A value of $V_1$ is substantially equal to a value of $V_2$, and thus first DC bus 120 has a voltage substantially equal to a value of $V_2$ established by ESD string 114. Thus, $V_2$ on first DC bus 120 and first side 124 of DC-to-DC converter 122 is converted thereby to a third DC voltage (i.e., $V_3$) on second DC bus 126. Also, in the exemplary embodiment, $V_3$ is a different voltage value from $V_1$ and $V_2$, and an operating voltage of electrical load device is substantially equal to $V_3$. In other embodiments, not shown, $V_3$ is substantially equal to $V_1$ and $V_2$. DC-to-DC converter 122 is further configured to at least one of inductively couple and galvanically isolate first DC bus 120 to and from, respectively, second DC bus 126, thus providing efficient DC-to-DC power conversion with effective fault tolerance.

Also, in operation, power converter system 100 includes at least one bus sensor 132 (e.g., an ammeter) coupled to second DC bus 126. Bus sensor 132 is also at least one of electrically and communicatively coupled to hybrid active power link device 102. Bus sensor 132 is configured to transmit a current signal 134 representative of a value of a load current (i.e., $I_L$) flowing through electrical load device 130. Electrical load device 130 operates at an average value of $V_3$ and an average value of $I_L$, and thus has an average power requirement (i.e., $P_{avg}$). Modularity of hybrid active power link device 102 and power converter system 100 enables the design thereof to suit a wide variety of applications with widely ranging operating voltages of both first DC bus 120 and second DC bus 126. For example, and without limitation, where power converter system 100 has $V_1$=1 kV, i.e., a low voltage first side 124, and with 1 kV<$V_3$≤20 kV, i.e., a medium voltage second side 128, electrical load device 130 requires an average power, i.e., $P_{avg}$=$V_3$*$I_L$. Thus, for electrical load device 130, users of power converter system 100 determine average value of $V_3$ and average value of $I_L$ for operation, and electrical load device 130 is selected to have an average electrical power rating, i.e., $P_{avg}$=$V_3$*$I_L$. Further, in operation, at least one additional electrical power rating, e.g., a peak power rating $P_{peak}$, is determined by users of power converter system 100 for electrical load device 130. The at least one additional electrical power rating is greater than $P_{avg}$ and represents an upper limit on electrical power that electrical load device 130 is expected to experience (e.g., during load transients) during operation of the exemplary embodiment.

ESD string 114 having at least one third-type ESD 116 is maintained at $V_2$ and functions as the main power source for supplying $P_{avg}$ to electrical load device 130 through DC-to-DC converter 122. An average value of a first bus current (i.e., $I_1$) thus flows from ESD string 114 on first DC bus 120 to supply an amount of electrical power to first side 124 of DC-to-DC converter 122 substantially equal to $P_{avg}$ on second side 128 of DC-to-DC converter 122. First-type ESDs 310 of plurality of APLMs 104 and second-type ESDs 110 are maintained at respective voltage potentials such that hybrid active power link device 102 is maintained at $V_1$=$V_2$. During such times when electrical load device 130 requires the additional power rating (i.e., $P_{peak}$, e.g., required during load transients, as indicated, e.g., by bus sensor 132) to be supplied thereto, power converter system 100 discharges at least one of first-type ESDs 310 of plurality of APLMs 104 and second-type ESDs 110 to supply a supplemental DC current (i.e., $I_{supp}$) to $I_1$ on first DC bus 120 at a voltage substantially equal to $V_2$. Thus, a value of current substantially equal to $I_1$+$I_{supp}$ is transmitted from both of ESD string 114 and hybrid active power link device 102 to DC-to-DC converter 122, which thereby supplies $P_{peak}$=$V_2$*($I_1$+$I_{supp}$) to electrical load device 130 when required.

Figure 2:
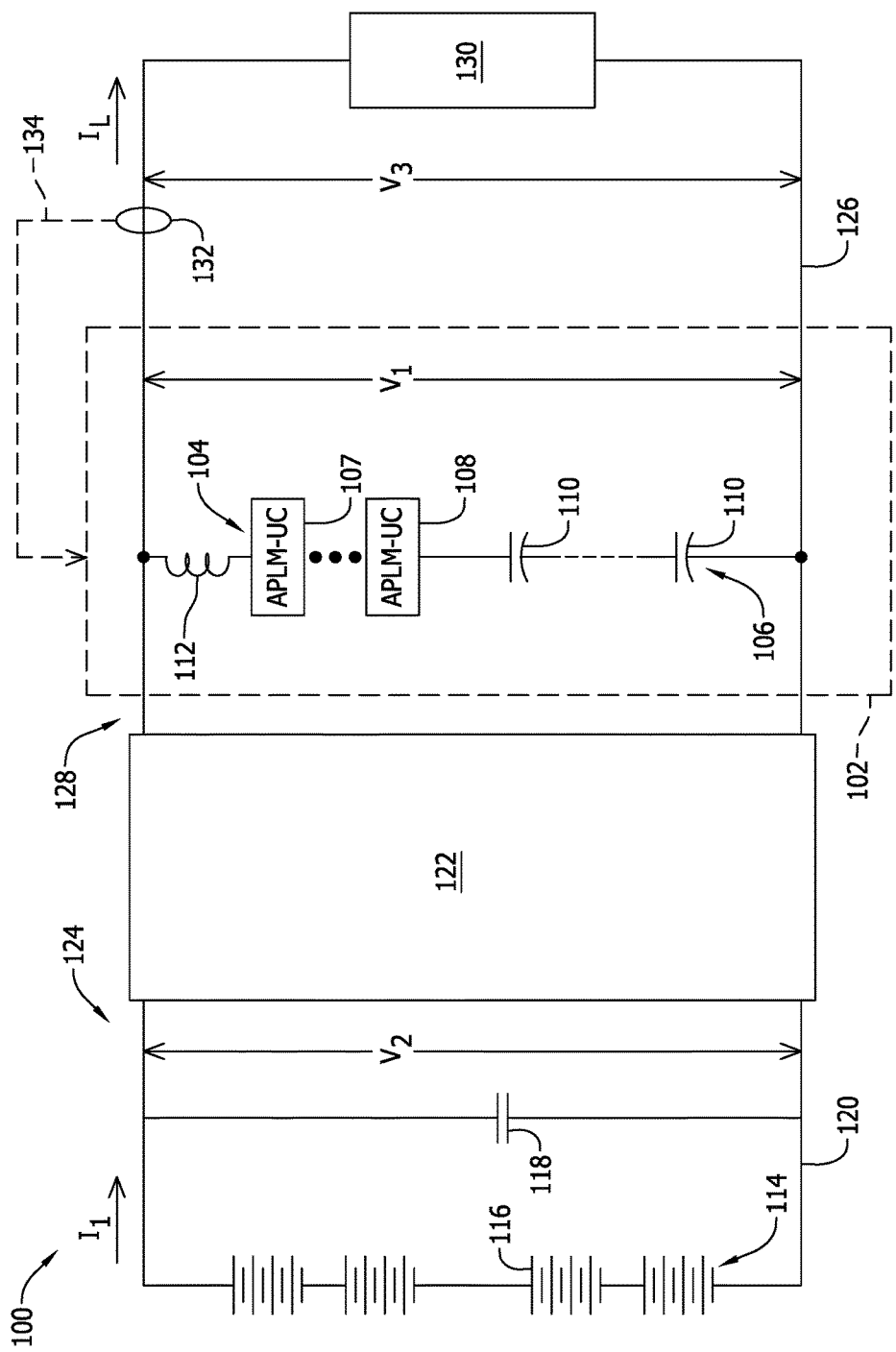
FIG. 2 is a schematic diagram of an alternative embodiment of a power converter system.

FIG. 2 is a schematic diagram of an alternative embodiment of power converter system 100. In the alternative embodiment, power converter system 100 includes at least one hybrid active power link device 102 coupled in electrical parallel to second DC bus 126 on second side 128 of DC-to-DC converter 122. In other embodiments, not shown, power converter system 100 includes at least one hybrid active power link device 102 coupled in electrical parallel to both of first DC bus 120 and second DC bus 126.

In operation, in the alternative embodiment, hybrid active power link device 102 is configured to induce $V_1$ and ESD string 114 is configured to induce $V_2$. $V_1$ is substantially equal to $V_3$, and thus second DC bus 126 has a voltage substantially equal to a value of $V_3$ established by second side of DC-to-DC converter 122 and electrical load device 130. Thus, $V_2$ on first DC bus 120 is converted by DC-to-DC converter 122 to $V_3$ on second DC bus 126. Also, in the alternative embodiment, $V_3$ is a different voltage value from $V_2$, and an operating voltage of electrical load device is substantially equal to $V_3$. In other embodiments, not shown, $V_3$ is substantially equal to $V_2$. DC-to-DC converter 122 is further configured to at least one of inductively couple and galvanically isolate first DC bus 120 to and from, respectively, second DC bus 126, thus providing efficient DC-to-DC power conversion with effective fault tolerance.

Also, in operation, power converter system 100 includes at least one bus sensor 132 (e.g., ammeter) coupled to second DC bus 126 and coupled to hybrid active power link device 102 (as shown and described above with reference to FIG. 1). Electrical load device 130 operates at an average value of $V_3$ and an average value of $I_L$, and thus has the average power requirement (i.e., $P_{avg}$=$V_3$*$I_L$, as shown and described above with reference to FIG. 1). Further, in operation, at least one additional electrical power rating, e.g., $P_{peak}$>$P_{avg}$, represents an upper limit on electrical power that electrical load device 130 is expected to experience (e.g., during load transients) during operation of the alternative embodiment.

ESD string 114 having at least one third-type ESD 116 is maintained at $V_2$ and functions as the main power source for supplying $P_{avg}$ to electrical load device 130 through DC-to-DC converter 122. The average value of $I_1$ at a voltage substantially equal to $V_2$ thus supplies the amount of electrical power to first side 124 substantially equal to $P_{avg}$. First-type ESDs 310 of plurality of APLMs 104 and second-type ESDs 110 are maintained at respective voltage potentials such that hybrid active power link device 102 is maintained at $V_1$=$V_3$. During such times when electrical load device 130 requires $P_{peak}$ (e.g., during load transients, as indicated, e.g., by bus sensor 132) to be supplied thereto, power converter system 100 discharges at least one of first-type ESDs 310 of plurality of APLMs 104 and second-type ESDs 110 to supply $I_{supp}$ to $I_L$ on second DC bus 126 at a voltage substantially equal to $V_3$. Thus, a current substantially equal to $I_L+I_{supp}$ is transmitted from both of second side 128 of DC-to-DC converter 122 and hybrid active power link device 102 to electrical load device 130, which thereby supplies $P_{peak}=V_3*(I_L+I_{supp})$ to electrical load device 130 when required.

Figure 3:
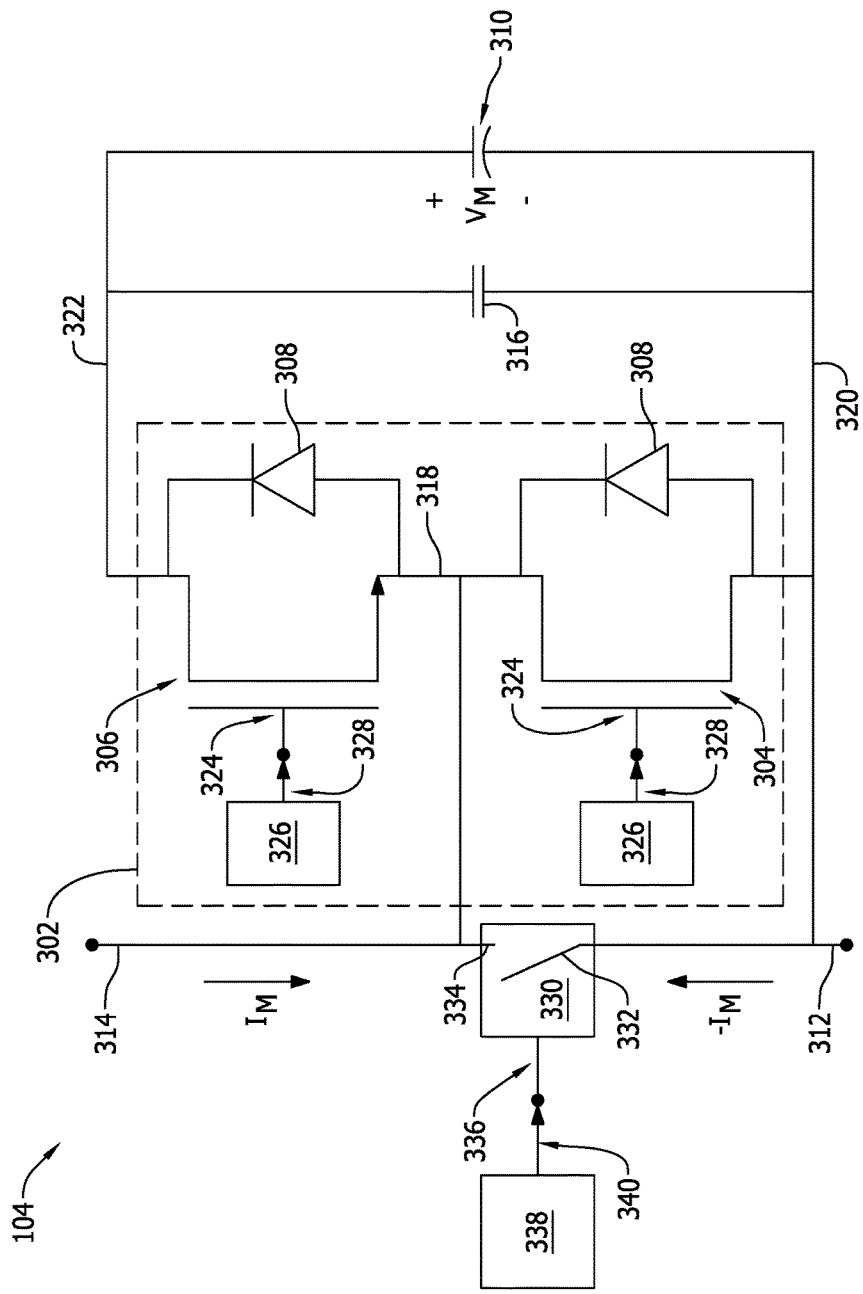
FIG. 3 is a schematic diagram of an exemplary embodiment of an active power link module (APLM) that may be used in the power converter systems shown in FIGS. 1 and 2.

FIG. 3 is a schematic diagram of an exemplary embodiment of APLM 104 that may be used in power converter system 100 (shown in FIGS. 1 and 2, respectively). In the exemplary embodiment, each APLM 104 of plurality of APLMs 104 includes a plurality of switching devices 302. Plurality of switching devices 302 includes a first switching device 304 and a second switching device 306 coupled in electrical series with first switching device 304. Each switching device 302 of plurality of switching devices 302 includes an antiparallel diode 308 coupled in electrical parallel thereto. APLM 104 includes at least one first-type ESD 310 coupled in electrical parallel with both of first switching device 304 and second switching device 306. First-type ESD 310 induces a module DC voltage, i.e., $V_M$, across a first APLM terminal 312 and a second APLM terminal 314 of APLM 104. A capacitor 316 is coupled in electrical parallel with both of first switching device 304 and second switching device 306.

In the exemplary embodiment, first-type ESD 310 is embodied in an ultracapacitor. In other embodiments, not shown, first-type ESD 310 is embodied in at least one of a battery, a film capacitor, an electrolytic capacitor, and a fuel cell. First-type ESD 310 is a same type of ESD (e.g., ultracapacitor) as second-type ESD 110, but a different type of ESD than third-type ESD 116 (e.g., battery). In other embodiments, not shown, first-type ESD 310 is the same type of ESD as third-type ESD 116. Also, in the exemplary embodiment, second-type ESD 110 is configured to store a greater amount of electrical energy than first-type ESD 310.

First switching device 304 is coupled in electrical series to second switching device 306 at a first node 318. First node 318 includes second APLM terminal 314. First switching device 304 is further coupled to a second node 320 opposite first node 318. Second node 320 includes first APLM terminal 312. Second switching device 306 is further coupled to a third node 322 opposite first node 318. Similarly, first-type ESD 310 and capacitor 316 are coupled to second node 320 and third node 322. Each switching device 302 of plurality of switching devices 302 is embodied in an insulated-gate bipolar transistor (IGBT). In other embodiments, not shown, each switching device 302 of plurality of switching devices 302 is embodied in at least one of an integrated gate commutated thyristor, a non-linear controllable resistor, a varistor, and a transistor other than IGBT-type including, without limitation, a metal-oxide semiconductor field-effect transistor (MOSFET), an injection enhanced gate transistor, a junction gate field-effect transistor (JFET), a bipolar junction transistor (BJT), and combinations thereof. These devices can be made of at least one of silicon (Si) and wide bandgap materials such as at least one of silicon carbide (SiC) and gallium nitride (GaN).

Each switching device 302 of plurality of switching devices 302 includes a switch terminal 324 coupled to a switching controller 326. Switching controller 326 is configured to transmit at least one switch control signal 328 to alternately open and close first switching device 304 and second switching device 306 and to control their switching states including, without limitation, a frequency and a duty cycle of their switching. Switching controller 326 is further configured to transmit at least one switch control signal 328 to alternately open and close at least one switching device 302 of plurality of switching devices 302. Thus, switching controller 326 enables power converter system 100 to establish a plurality of switching states of plurality of switching devices 302 in APLM 104. In other embodiments, not shown, switching controller 326 receives and transmits other control signals to and from other controllers located elsewhere at least one of within and outside at least one of APLM 104 and power converter system 100.

Further, in the exemplary embodiment, at least one bypass switch 330 including, without limitation, such devices as non-linear controllable resistors, varistors, and transistors such as IGBTs, MOSFETs, JFETs, BJTs, and relays, is coupled to APLM 104. Bypass switch 330 is coupled in electrical parallel with at least one switching device 302 of plurality of switching devices 302. Bypass switch 330 includes a first bypass terminal 332 coupled to second node 320 and a second bypass terminal 334 coupled to first node 318. Bypass switch 330 also includes a bypass control terminal 336 coupled to at least one bypass controller 338. Bypass controller 338 is configured to transmit a bypass control signal 340 to bypass control terminal 336 to alternately open and close bypass switch 330. For example, and without limitation, bypass controller 338 transmits bypass control signal 340 to close bypass switch 330 when at least one APLM state, including, without limitation, a physical state such as voltage, current, charge, and temperature associated with first-type ESD 310, is present. Likewise, bypass controller 338 is configured to transmit bypass control signal 340 to bypass control terminal 336 to open bypass switch 330 when at least one APLM state is not present. When bypass switch 330 is open, an APLM 104 current, i.e., $I_M$, flows through APLM 104 to at least one of first-type ESD 310 and plurality of switching devices 302. When bypass switch 330 is closed, on the other hand, $I_M$ does not flow through APLM 104, i.e., $I_M$ is bypassed around APLM 104.

In operation, in the exemplary embodiment, plurality of switching devices 302 provide MMC-like power electronics integrated into each APLM 104. The flow of $I_M$ and the direction in which $I_M$ flows, i.e., $I_M$ versus $-I_M$, in H-APLM string 106 is controlled via the timing of switching states of plurality of switching devices 302, as implemented by switching controller 326. As such, in operation of the exemplary embodiment, switching controller 326 facilitates maintaining a desired charging or discharging state of both first-type ESD 310 and second-type ESD 110, and thereby the proportion of electrical power supplied to at least one of first DC bus 120 and second DC bus 126 by hybrid active power link device 102. For example, and without limitation, to provide $P_{avg}$ to electrical load device 130, switching controller 326 alternately opens and closes both of first switching device 304 and second switching device 306 at a predetermined frequency and duty cycle to maintain an efficient power and energy balance between and among first-type ESD 310, second-type ESD 110, and third-type ESD 116.

Also, in operation, bypass controller 338 is configured to transmit bypass control signal 340 to close bypass switch 330 when the at least one APLM state has a first predetermined value, and open bypass switch 330 when the at least one APLM state has a second predetermined value different from the first predetermined value. At least one of bypass controller 338 and switching controller 326 is further configured to determine an operational status including a functional status and a non-functional status of at least one APLM 104 of plurality of APLMs 104 in power converter system 100. For example, and without limitation, a physical state of APLM 104 such as an elevation of temperature of first-type ESD 310 above a predetermined threshold temperature is indicative of a non-functional status of APLM 104, whereas a temperature of first-type ESD 310 within a predetermined range of temperatures is indicative of a functional status of APLM 104. Similarly, an operating voltage of first-type ESD 310 outside a predetermined tolerance of $V_M$ is indicative of a non-functional status of APLM 104, whereas the operating voltage of first-type ESD 310 within the predetermined tolerance of $V_M$ is indicative of a functional status of APLM 104.

Each APLM 104 of plurality of APLMs 104 is detachably and electrically coupled to hybrid active power link device 102 such that, in the event of malfunction, a non-functional APLM 104 is removable from modular power converter system 100 as a replaceable module that is detachably and electrically coupled to hybrid active power link device 102. Bypass switch 330 is further configured to alternately electrically couple and electrically isolate respective at least one functional and at least one non-functional APLM 104, respectively, of plurality of APLMs 104 to and from, respectively, hybrid active power link device 102 and power converter system 100.

Further, in operation, switching controller 326 is configured (e.g., by programming a control logic thereof in at least one of the software and firmware of switching controller 326) to control the switching states including, without limitation, a timing, frequency, and duty cycle of switching, of plurality of switching devices 302 in APLM 104. The plurality of switching states are established in APLM 104 through switching controller 326 transmitting switch control signal 328. The plurality of switching states of the plurality of switching devices 302 in APLM 104 includes a first switching state where $I_L$ is substantially equal to the value of the average DC current through electrical load device 130. The first switching state is thus configured to at least one of maintain hybrid active power link device 102 at $V_1$ and charge at least one of first-type ESD 310 and second-type ESD 110 to enable hybrid active power link device 102 to reach a voltage potential substantially equal to $V_1$. The plurality of switching states of the plurality of switching devices 302 in APLM 104 also includes a second switching state different from first switching state where $I_L$ is greater than the value of the average DC current through electrical load device 130 by a predetermined amount. The second switching state is thus configured to discharge at least one of first-type ESD 310 and second-type ESD 110 in hybrid active power link device 102 to provide $I_{supp}$ when needed by electrical load device 130. A value of $I_{supp}$ is thus substantially equal to:

$$I_{supp} = n^* I_M + m^* I_{UC},\qquad \text{Equation (1)}$$

where n is the number of APLMs 104 of plurality of APLMs 104 whose first-type ESD 310 is being discharged during second switching state, $I_M$ is the resulting current through each APLM 104 being discharged, m is a number of second-type ESDs 110 in hybrid active power link device 102, and $I_{UC}$ is a value of current supplied from each second-type ESD 110 on H-APLM string 106.

Figure 4:
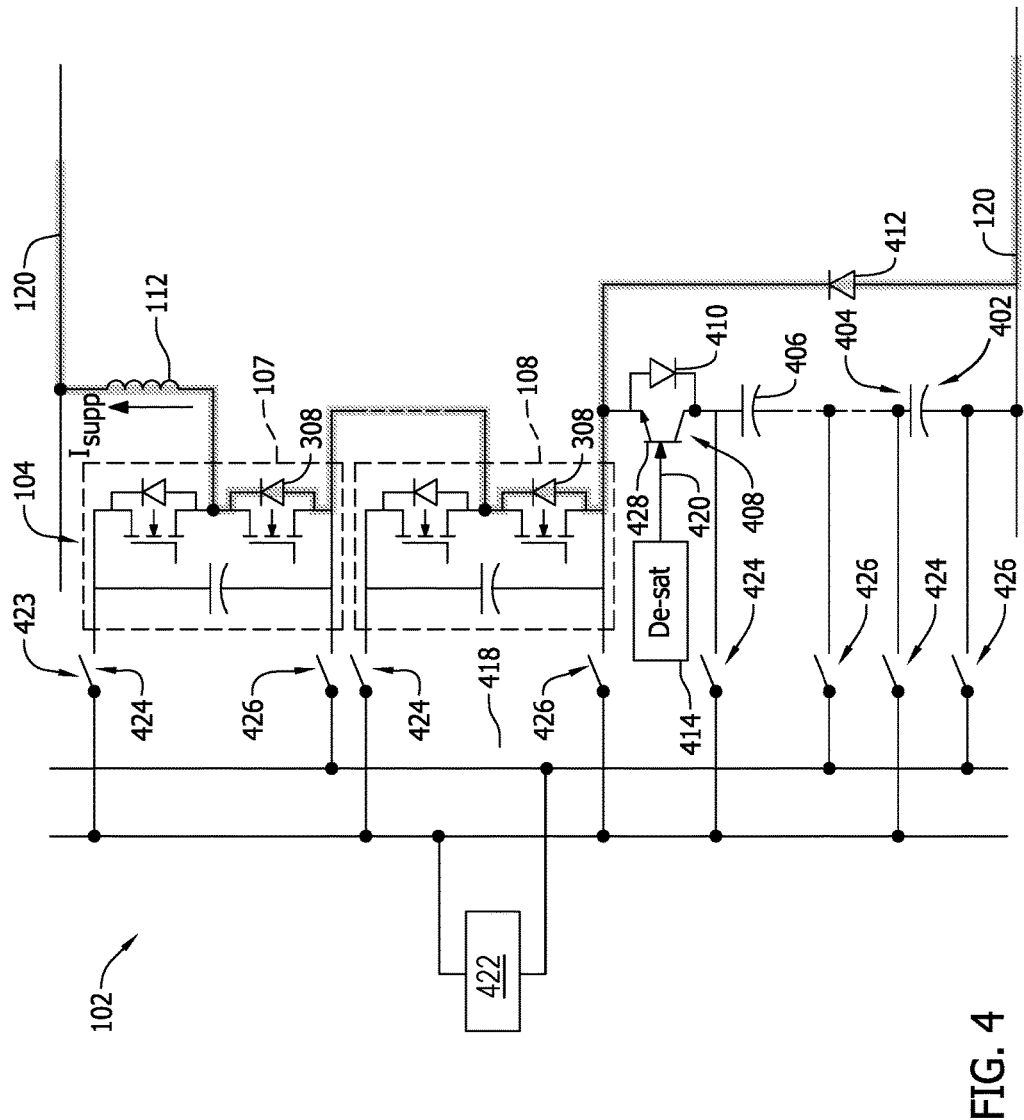
FIG. 4 is a schematic diagram of an exemplary embodiment of a hybrid active power link device that may be used with the power converter systems shown in FIGS. 1 and 2.

FIG. 4 is a schematic diagram of an exemplary embodiment of hybrid active power link device 102 that may be used with power converter system 100 (shown in FIGS. 1 and 2, respectively). In the exemplary embodiment, hybrid active power link device 102 is coupled to first DC bus 120 (as shown and described above with reference to FIG. 1). In other embodiments, not shown, hybrid active power link is coupled to second DC bus 126 (as shown and described above with reference to FIG. 2). Hybrid active power link device 102 includes a plurality of second-type ESDs 402 including a first second-type ESD 404 (i.e., a first second-type ESD 110) and a second second-type ESD 406 (i.e., a second second-type ESD 110) coupled to each other in electrical series. First second-type ESD 404 is coupled to first DC bus 120 opposite second second-type ESD 406. Hybrid active power link device 102 also includes a third switching device 408 coupled in electrical series to second second-type ESD 406 and second APLM 108 of plurality of APLMs 104. Third switching device 408 extends between second second-type ESD 406 and second APLM 108, and includes a shunt diode 410 coupled in electrical parallel thereto. Third switching device 408 is embodied in an IGBT. In other embodiments, not shown, third switching device 408 is embodied in at least one of an integrated gate commutated thyristor, a non-linear controllable resistor, a varistor, and a transistor other than IGBT-type including, without limitation, a MOSFET, an injection enhanced gate transistor, a JFET, a BJT, and combinations thereof. These devices can be made of at least one of Si and wide bandgap materials such as at least one of SiC and GaN.

Hybrid active power link device 102 further includes a freewheel diode 412 coupled in electrical parallel with both of plurality of second-type ESDs 402 and third switching device 408. Hybrid active power link device 102 also includes a desaturation controller 414 coupled to third switching device 408 and coupled to first DC bus 120. In other embodiments, not shown, e.g., in embodiments where hybrid active power link device 102 is coupled to second DC bus 126, desaturation controller 414 is coupled to second DC bus 126. Desaturation controller 414 is configured to at least one of measure and detect a change in a voltage drop across first DC bus 120 (and second DC bus 126, in those embodiments, not shown, where hybrid active power link device 102 is coupled to second DC bus 126). An overcurrent condition is detected upon desaturation controller 414 determining that at least one of a value of the voltage drop across first DC bus 120 and a change in voltage potential across first DC bus 120 at least one of meets and exceeds a predetermined threshold. In response to overcurrent condition, desaturation controller 414 is further configured to transmit a desaturation control signal 420 to third switching device 408.

Hybrid active power link device 102 also includes an electrical power supply 422 coupled in electrical parallel with each APLM 104 of plurality of APLMs 104 (i.e., each of first APLM 107 and second APLM 108). Electrical power supply 422 is also coupled in electrical parallel with each second-type ESD 402 of plurality of second-type ESDs 402 (i.e., first second-type ESD 404 and second second-type ESD 406). Each APLM 104 of plurality of APLMs 104 and each second-type ESD 402 of plurality of second-type ESDs 402 is coupled in electrical parallel to electrical power supply 422 through a plurality of relays 423 including a first relay 424 and a second relay 426. Also, in the exemplary embodiment, plurality of relays 423 are coupled to switching controller 326, not shown, and are controlled thereby based on a charge status of respective first-type ESDs 310 and second-type ESDs 110 of hybrid active power link device 102. In other embodiments, not shown, plurality of relays 423 are coupled to other controllers besides switching controller including, without limitation, a charge controller, not shown, located at least one of within and outside of power converter system 100.

In operation, in the exemplary embodiment, desaturation controller 414 is configured to detect an overcurrent condition including, without limitation, a short circuit fault current, on first DC bus 120. Overcurrent condition is representative of a presence of a fault in at least one of second-type ESD 402, electrical load device 130, and at least one APLM 104 of plurality of APLMs 104. Upon detecting the overcurrent condition, desaturation controller 414 transmits, in real time, desaturation control signal 420 to, for example and without limitation, a gate terminal 428 of an IGBT-type third switching device 408 to change its switching state. Alternately changing switching states of third switching device 408 thus alternately enables and disables hybrid active power link device 102 from supplying $I_{supp}$ to electrical load device 130 as needed.

Desaturation controller 414, third switching device 408, shunt diode 410, freewheel diode 412, and inductor 112 function as an overcurrent protection subsystem in power converter system 100. As described above with reference to FIG. 3, second-type ESD 110 is configured to store a greater amount of electrical energy than first-type ESD 310. As such, inclusion of overcurrent protection subsystem in power converter system 100 mitigates electrical arcing and provides effective fault isolation for protection of users, system components, and electrical load device 130.

Desaturation control signal 420 is configured to alternately open third switching device 408 (i.e., to disable flow of electrical current therethrough) and close third switching device 408 (i.e., to enable flow of electrical current therethrough) when overcurrent condition (i.e., as detected by desaturation controller 414) is present and absent, respectively. Such controlled alternation of switching states of third switching device 408 implemented by desaturation controller 414 and overcurrent protection subsystem facilitates alternately electrically isolating and electrically coupling plurality of second-type ESDs 402 and plurality of APLMs 104 based on the presence and absence, respectively, of overcurrent condition.

Upon opening third switching device 408 in response to overcurrent condition in at least one location in power converter system 100, flow of at least one of a fault current and $I_{supp}$ through hybrid active power link device 102 is diverted through freewheel diode 412 around plurality of second-type ESDs 402 and third switching device 408. Also, in the exemplary embodiment, desaturation controller 414 is further coupled to switching controller 326, not shown, in each APLM 104 of plurality of APLMs 104. Upon desaturation controller 414 transmitting desaturation control signal 420 to open third switching device 408 in response to overcurrent condition, desaturation controller 414 transmits a control signal, not shown, in real time to switching controller 326 to open plurality of switching devices 302. Opening plurality of switching devices 302 of each APLM 104 of plurality of APLMs 104 in response to overcurrent condition thus disables a contribution of first-type ESDs 310 to $I_{supp}$.

As indicated by a shaded current path in FIG. 4, a diverted current path of at least one of fault current and $I_{supp}$ passes through devices (e.g., including freewheel diode 412, anti-parallel diodes 308, and inductor 112) which effectively dissipate electrical energy, yet provide a slower and smoother time rate of change (i.e., dI/dt) of at least one of a decreasing fault current and a decreasing $I_{supp}$. With first-type ESDs 310 and second-type ESDs 110 electrically isolated from hybrid active power link device 102 during overcurrent condition, at least one of a residual fault current and a residual $I_{supp}$ (i.e., on account of inductor 112 and return path current from electrical load device 130) freewheels through hybrid active power link device 102 until such current is no longer being added to first DC bus 120. Thus, in the exemplary embodiment, electrical load device 130 need not be placed out of service in the event of overcurrent condition and continues to be supplied with $P_{avg}$ from ESD string 114. Furthermore, given the modularity and redundancy qualities of hybrid active power link device 102 in power converter system 100, at least one of a faulty APLM 104, a faulty first-type ESD 310, and a faulty second-type ESD 110 is replaceable in an expeditious manner and returns to full operation to support electrical load device 130 as described above.

Also, in operation, electrical power supply 422 is configured as a charger to facilitate maintaining first-type ESDs 310 of plurality of APLMs 104 and plurality of second-type ESDs 402 at voltage potentials enabling maintenance of hybrid active power link device 102 at $V_1$. In the exemplary embodiment, electrical power supply 422 configured as charger is embodied in a dedicated charger subsystem which operates at relatively low voltage and power levels relative to voltages maintained in power converter system 100 (i.e., $V_M$, $V_{UC}$, $V_1$, $V_2$, and $V_3$). In other embodiments, not shown, electrical power supply 422 configured as charger is embodied in at least one of a battery including without limitation, ESD string 114, and a second hybrid active power link device 102. In embodiments where charger is another APLM 104 of plurality of APLMs 104, electrical power supply 422 is further configured to actively balance storage of electrical energy between and amongst all APLMs 104 of plurality of APLMs 104 in hybrid active power link device 102. At least one of switching controller 326 and charge controller, not shown, alternately electrically couples and electrically isolates electrical power supply 422 from hybrid active power link device 102 through plurality of relays 423. Electrical power supply 422 is also used to charge first-type ESDs 310 and second-type ESDs 110 prior to commencing use of hybrid active power link device 102 in power converter system 100. In still other embodiments, not shown, electrical power supply 422 also includes a dissipative, i.e., resistive, electrical circuit for discharging first-type ESDs 310 and second-type ESDs 110 at least one of prior to and after ceasing operation of hybrid active power link device 102 in power converter system 100.

Figure 5:
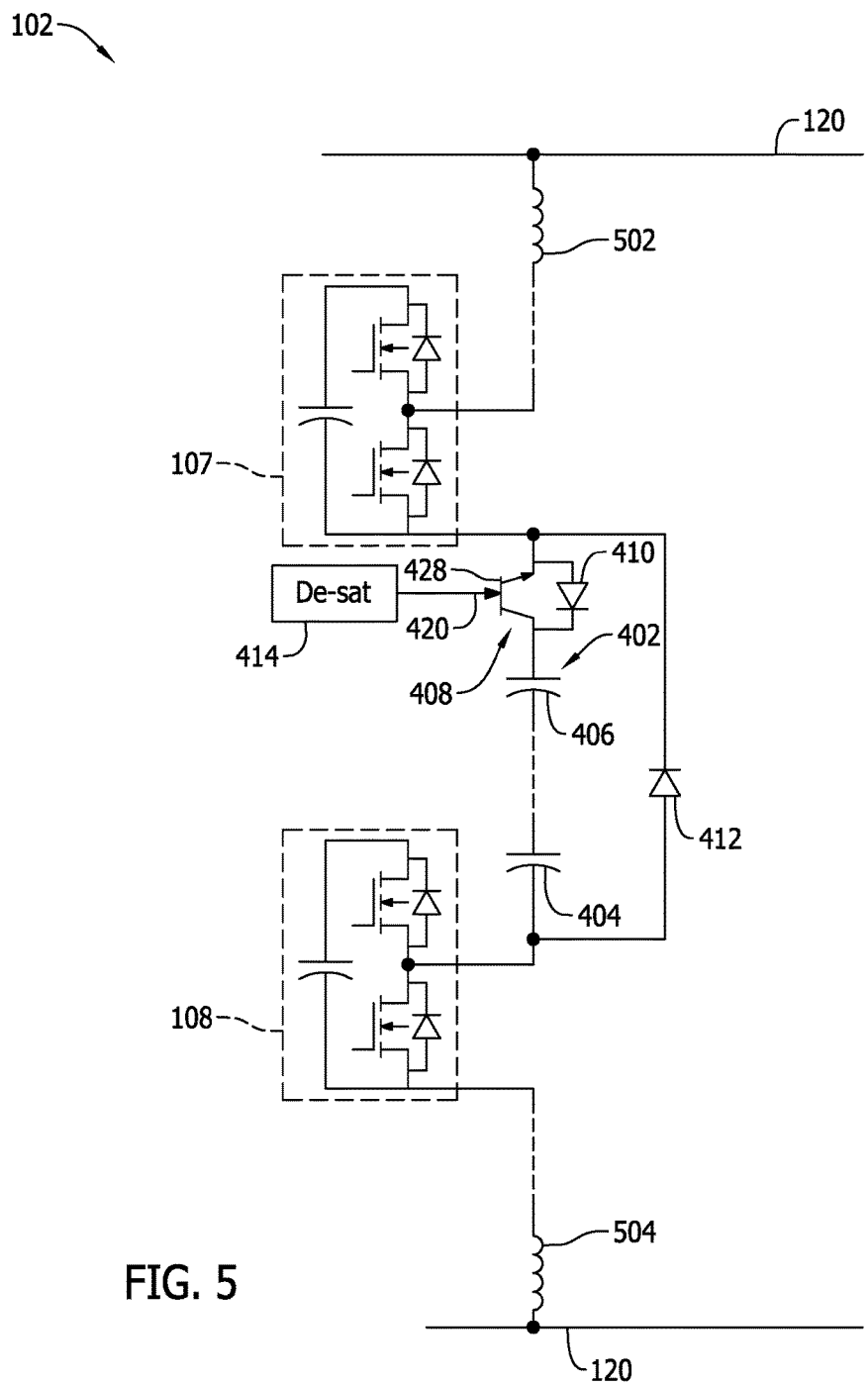
FIG. 5 is a schematic diagram of an alternative embodiment of a hybrid active power link device that may be used with the power converter systems shown in FIGS. 1 and 2.

FIG. 5 is a schematic diagram of an alternative embodiment of hybrid active power link device 102 that may be used with power converter system 100 (shown in FIGS. 1 and 2, respectively). In the alternative embodiment, hybrid active power link device 102 is coupled to first DC bus 120 (as shown and described above with reference to FIG. 1). In other embodiments, not shown, hybrid active power link device 102 is coupled to second DC bus 126 (as shown and described above with reference to FIG. 2). Hybrid active power link device 102 includes plurality of second-type ESDs 402 including first second-type ESD 404 (i.e., first second-type ESD 110) and second second-type ESD 406 (i.e., second second-type ESD 110) coupled to each other in electrical series. Hybrid active power link device 102 also includes plurality of APLMs 104 including first APLM 107 and second APLM 108. A first inductor 502 is coupled to first APLM 107 and first DC bus 120. A second inductor 504 is coupled to second APLM 108 and first DC bus 120. First inductor 502 is positioned opposite second second-type ESD 406 with respect to first APLM 107, and second inductor 504 is positioned opposite first second-type ESD 404 with respect to second APLM 108. Hybrid active power link device 102 further includes third switching device 408 coupled in electrical series with first APLM 107 and second second-type ESD 406. Also, in the alternative embodiment, plurality of second-type ESDs 402 extend between and are coupled in electrical series to third switching device 408 and second APLM 108.

Further, in the alternative embodiment, plurality of APLMs 104 includes an even number of APLMs 104 with an equal number of APLMs 104 coupled to opposing ends of plurality of second-type ESDs 402. In other embodiments, not shown, plurality of APLMs 104 also includes an even number of APLMs 104, but with first APLM 107 embodied in a plurality of first APLMs 107 and second APLM 108 embodied in a plurality of second APLMs 108. Thus, in the alternative embodiment, a symmetry in architecture and switching schemes is present in hybrid active power link device 102 that provides advantages including, without limitation, electromagnetic interference (EMI) performance (as shown and described below with reference to FIG. 6).

Figure 6:
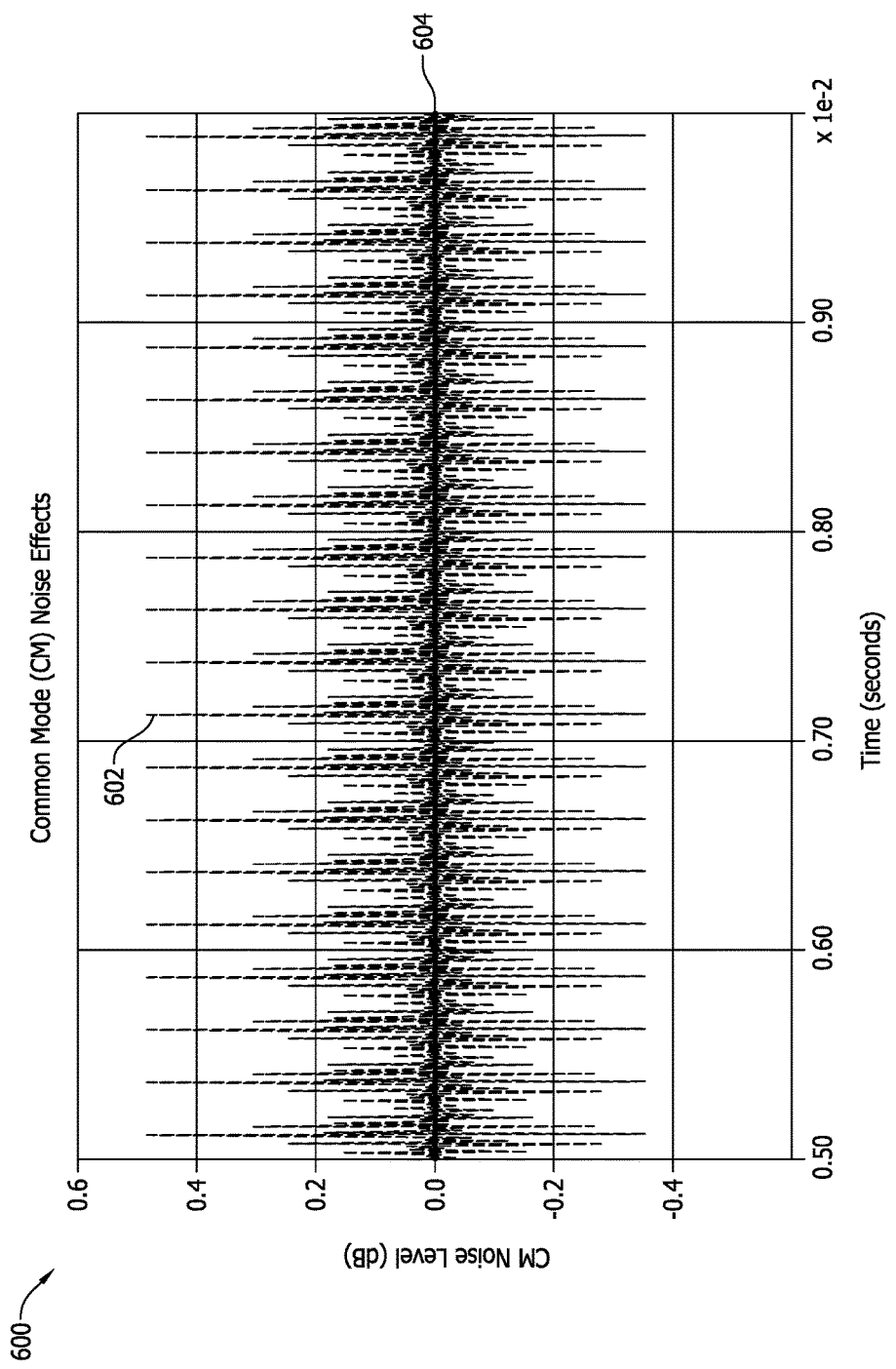
FIG. 6 is a graphical representation of operation of the power converter systems shown in FIGS. 1 and 2.

FIG. 6 is a graphical representation, i.e., graph 600, of operation of power converter system 100 (shown in FIGS. 1 and 2). In the exemplary embodiment, graph 600 includes a first plot 602 and a second plot 604. Each of first plot 602 and second plot 604 depict common-mode (CM) noise level versus time for power converter system 100 with hybrid active power link devices 102 (shown in FIG. 4 and FIG. 5, respectively). EMI performance characteristics of power converter system 100 were determined using a line impedance stabilization network (LISN) method with a distributed stray capacitance of 14 nanoFarads (nF) assumed in both of first plot 602 and second plot 604 between power converter system 100 and a ground. Power converter system 100 with the exemplary hybrid active power link device 102 shown in FIG. 4 exhibits CM noise levels which vary periodically and range from approximately −0.4 dB to approximately 0.5 dB. Power converter system 100 with the alternative hybrid active power link device 102 shown in FIG. 5, on the other hand, exhibits CM noise levels substantially equal to 0 (zero) dB, and without periodic variations.

As shown and described above with reference to FIG. 5, the substantially symmetrical design of hybrid active power link device 102 and implementing a symmetry in switching schemes for plurality of switching devices 302 in plurality of APLMs 104 enables effective CM noise elimination, which is evident in second plot 604. Coupling plurality of second-type ESDs 402 between at least two APLMs 104, and including first inductor 502 and second inductor 504 on first DC bus 120 facilitates CM noise elimination in applications requiring high EMI performance characteristics including, without limitation, land and sea transportation and military vehicles, and commercial and military aircraft.

Figure 7:
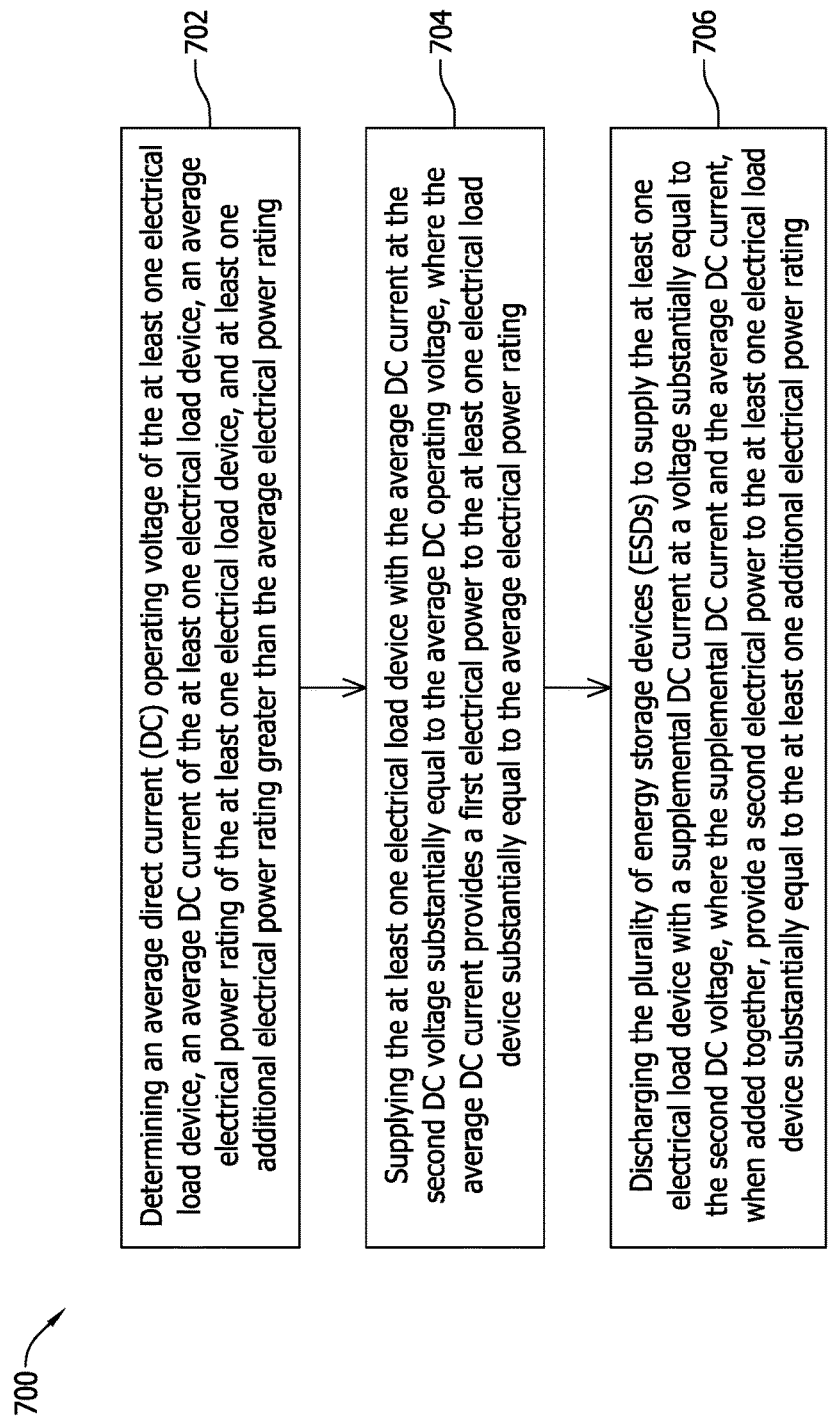
FIG. 7 is a flowchart diagram of an exemplary method of operating a power converter system that may be used with the power converter systems shown in FIGS. 1 and 2.

FIG. 7 is a flowchart diagram of an exemplary method 700 of operating a power converter system that may be used with power converter system 100 (shown in FIGS. 1 and 2, respectively). Referring to FIGS. 1, 3, and 7, in the exemplary embodiment, method 700 includes determining 702 average DC operating voltage (i.e., $V_3$) of electrical load device 130, average DC current (i.e., $I_L$) of electrical load device 130, average electrical power rating (i.e., $P_{avg}$) of electrical load device 130, and at least one additional electrical power rating (i.e., $P_{peak}$) greater than $P_{avg}$. Method 700 also includes supplying 704 electrical load device 130 with average DC current at $V_2$ substantially equal to $V_3$, where average DC current provides a first electrical power to electrical load device 130 substantially equal to $P_{avg}$. Method 700 also includes discharging 706 plurality of ESDs (i.e., at least one of first-type ESDs 310 in plurality of APLMs 104 and second-type ESD 110) to supply electrical load device 130 with $I_{supp}$ at a voltage substantially equal to $V_2$, where $I_{supp}$ and average DC current, when added together, provide a second electrical power to electrical load device 130 substantially equal to $P_{peak}$.

The above-described hybrid active power link devices and associated systems and methods enable functional integration of MMC-like power electronics into ESDs such as ultracapacitors for applications in a wide range of DC power system operating voltages. The above-described embodiments also provide a modular, building block-based system which enables scalability and redundancy, and high efficiency and fault tolerant operation in both centralized and distributed power conversion applications. Further, the above-described embodiments facilitate use of simplified control schemes for EMSs based on current and power profiles of supported electrical loads. The above-described hybrid active power link devices and associated systems and methods also provide a high efficiency power converter having improved specific power density, less design and development time and expense, and reduced NRE and other operating costs relative to known systems. The above-described embodiments further enable effective functional integration of numerous ESD types into DC power conversion systems without requiring heavy and bulky inductive and capacitative components. Furthermore, the above-described embodiments provide lower operational and maintenance costs, and enable lower complexity control systems in applications requiring only partial control for moderate transient support of electrical load devices.

An exemplary technical effect of the above-described hybrid active power link devices and associated systems and methods includes at least one of the following: (a) enabling functional integration of MMC-like power electronics into ESDs such as ultracapacitors for applications in a wide range of DC power system operating voltages; (b) providing a modular, building block-based system which enables scalability and redundancy, and high efficiency and fault tolerant operation in both centralized and distributed power conversion applications; (c) facilitating use of simplified control schemes for EMSs based on current and power profiles of supported electrical loads; (d) providing a high efficiency power converter having improved specific power density, less design and development time and expense, and reduced NRE and other operating costs relative to known systems; (e) enabling effective functional integration of numerous ESD type into DC power conversion systems without requiring heavy and bulky inductive and capacitive components; (f) providing lower operational and maintenance costs relative to known systems and methods; and (g) enabling lower complexity control systems in applications requiring only partial control for moderate transient support of electrical load devices.

Exemplary embodiments of hybrid active power link devices, and methods of operating such systems and devices are not limited to the specific embodiments described herein, but rather, components of systems and/or steps of the methods may be utilized independently and separately from other components and/or steps described herein. For example, the systems may also be used in combination with other systems requiring modularity, scalability, and redundancy, and the associated methods, and are not limited to practice with only the systems and methods for hybrid active power link devices as described herein. Rather, the exemplary embodiment can be implemented and utilized in connection with many other power systems applications that are currently configured to provide high efficiency DC power conversion, e.g., and without limitation, power systems in renewable energy generation facilities.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer-readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structure elements that do not differ from the literal language of the claims, or if they include equivalent structural elements with insubstantial differences from the literal language of the claims.

What is claimed is:

1. A hybrid active power link device comprising:
   a plurality of active power link modules (APLMs), each APLM of said plurality of APLMs comprising:
      a plurality of switching devices comprising a first switching device and a second switching device coupled in series; and
      at least one first-type energy storage device (ESD) coupled in parallel with both of said first switching device and said second switching device; and
   at least one second-type ESD coupled in series with at least one APLM of said plurality of APLMs.

2. The hybrid active power link device in accordance with claim 1, wherein said plurality of APLMs comprises a first APLM and a second APLM coupled in series, said at least one second-type ESD further coupled in series with said second APLM, said second APLM positioned opposite said first APLM with respect to said at least one second-type ESD.

3. The hybrid active power link device in accordance with claim 1, wherein said at least one first-type ESD comprises at least one of a battery, an ultracapacitor, a film capacitor, an electrolytic capacitor, and a fuel cell, and wherein said at least one second-type ESD comprises at least one of a battery, an ultracapacitor, a film capacitor, an electrolytic capacitor, and a fuel cell.

4. The hybrid active power link device in accordance with claim 1, wherein both of said at least one first-type ESD and said at least one second-type ESD comprise at least one of a battery, an ultracapacitor, a film capacitor, an electrolytic capacitor, and a fuel cell, said at least one second-type ESD configured to store a greater amount of electrical energy than said at least one first-type ESD.

5. A power converter system comprising:
   at least one electrical load device;
   at least one hybrid active power link device coupled in parallel with said at least one electrical load device, said at least one hybrid active power link device comprising:
      a plurality of active power link modules (APLMs), each APLM of said plurality of APLMs comprising:
         a plurality of switching devices comprising a first switching device and a second switching device coupled in series; and
         at least one first-type energy storage device (ESD) coupled in parallel with both of said first switching device and said second switching device; and
      at least one second-type ESD coupled in series with at least one APLM of said plurality of APLMs, wherein said at least one hybrid active power link device is configured to induce a first direct current (DC) voltage.

6. The power converter system in accordance with claim 5, wherein said each APLM further comprises a replaceable module detachably and electrically coupled to said at least one hybrid active power link device.

7. The power converter system in accordance with claim 5 further comprising a switching controller coupled to said plurality of switching devices, said switching controller configured to transmit at least one switch control signal to alternately open and close at least one switch device of said plurality of switching devices.

8. The power converter system in accordance with claim 5 further comprising an electrical power supply coupled in parallel with said at least one APLM and said at least one second-type ESD.

9. The power converter system in accordance with claim 5, wherein said plurality of APLMs comprises a first APLM and a second APLM coupled in series, said at least one second-type ESD further coupled in series with said second APLM, said second APLM positioned opposite said first APLM with respect to said at least one second-type ESD.

10. The power converter system in accordance with claim 9 further comprising at least one inductor coupled in series with at least one of said first APLM and said second APLM.

11. The power converter system in accordance with claim 5 further comprising a bypass switch coupled in parallel with at least one switching device of said plurality of switching devices, said bypass switch configured to alternately electrically couple and electrically isolate said at least one APLM and said at least one hybrid active power link device.

12. The power converter system in accordance with claim 11 further comprising a bypass controller coupled to said bypass switch, said bypass controller configured to transmit a bypass control signal to alternately open and close said bypass switch.

13. The power converter system in accordance with claim 5, wherein said plurality of APLMs comprises at least one first APLM and at least one second APLM, said at least one second-type ESD further coupled in series with said at least one first APLM and said at least one second APLM, said at least one second-type ESD extending between said at least one first APLM and said at least one second APLM.

14. The power converter system in accordance with claim 13 further comprising at least one inductor, said at least one inductor comprising at least one of a first inductor coupled in series with said at least one first APLM and a second inductor coupled in series with said at least one second APLM, said first inductor positioned opposite said at least one second-type ESD with respect to said at least one first APLM, and said second inductor positioned opposite said at least one second-type ESD with respect to said at least one second APLM.

15. The power converter system in accordance with claim 5, said at least one hybrid active power link device further comprising a third switching device coupled in series with said at least one second-type ESD and said at least one APLM, said third switching device extending between said at least one second-type ESD and said at least one APLM, wherein said third switching device is configured to alternately open and close to alternately electrically couple and electrically isolate, respectively, said at least one second-type ESD and said plurality of APLMs.

16. The power converter system in accordance with claim 15 further comprising a freewheel diode coupled in parallel with both of said at least one second-type ESD and said third switching device, said freewheel diode configured to divert a flow of electrical current around both of said at least one second-type ESD and said third switching device upon opening said third switching device.

17. The power converter system in accordance with claim 15 further comprising a desaturation controller coupled to said third switching device, said desaturation controller configured to detect an overcurrent condition in at least one of said at least one second-type ESD, said at least one electrical load device, and said at least one APLM, said desaturation controller further configured to transmit a desaturation control signal to said third switching device to facilitate opening said third switching device in response to the overcurrent condition.

18. The power converter system in accordance with claim 5 further comprising at least one third-type ESD coupled in parallel with said at least one hybrid active power link device, wherein said at least one third-type ESD is configured to induce a second DC voltage.

19. The power converter system in accordance with claim 18, wherein said at least one third-type ESD comprises at least one of a battery, an ultracapacitor, a film capacitor, an electrolytic capacitor, and a fuel cell.

20. The power converter system in accordance with claim 18 further comprising:
    a first DC bus coupled in parallel with said at least one hybrid active power link device, said first DC bus having a voltage substantially equal to the second DC voltage;
    a second DC bus coupled in parallel with said at least one electrical load device; and
    a DC-to-DC converter coupled to said first DC bus and said second DC bus, said DC-to-DC converter configured to:
        inductively couple said first DC bus to said second DC bus; and
        convert the second DC voltage to a third DC voltage, said second DC bus having a voltage substantially equal to the third DC voltage.

21. The power converter system in accordance with claim 20, wherein the first DC voltage is different from the third DC voltage.

22. A method of operating a power converter system including at least one electrical load device coupled to at least one hybrid active power link device including a plurality of energy storage modules (ESDs) and a plurality of active power link modules (APLMs), the at least one hybrid active power link device configured to induce a first direct current (DC) voltage, the at least one electrical load device further coupled to a power source configured to induce a second DC voltage, said method comprising:
    determining an average DC operating voltage of the at least one electrical load device, an average DC current of the at least one electrical load device, an average electrical power rating of the at least one electrical load device, and at least one additional electrical power rating greater than the average electrical power rating;
    supplying the at least one electrical load device with the average DC current at the second DC voltage substantially equal to the average DC operating voltage, wherein the average DC current provides a first electrical power to the at least one electrical load device substantially equal to the average electrical power rating; and
    discharging the plurality of ESDs to supply the at least one electrical load device with a supplemental DC current at a voltage substantially equal to the second DC voltage, wherein the supplemental DC current and the average DC current, when added together, provide a second electrical power to the at least one electrical load device substantially equal to the at least one additional electrical power rating.

23. The method in accordance with claim 22, wherein each APLM of the plurality of APLMs includes a plurality of switching devices, said method further comprising:
    detecting, with a sensor, a load current through the at least one electrical load device; and
    transmitting, with a switching controller, a switch control signal to the plurality of switching devices to establish a plurality of switching states, the plurality of switching states including:
        a first switching state, wherein the load current is substantially equal to the average DC current, the first switching state configured to at least one of maintain the at least one hybrid active power link device at the first DC voltage and charge the plurality of ESDs to the first DC voltage; and
        a second switching state different from the first switching state, wherein the load current exceeds the average DC current by a predetermined amount, the second switching state configured to discharge the plurality of ESDs to supply the supplemental DC current.

24. The method in accordance with claim 22, wherein the plurality of ESDs include at least one first-type ESD coupled to each APLM of the plurality of APLMs and at least one second-type ESD coupled to at least one APLM of the plurality of APLMs, said method further comprising:
    detecting, with a desaturation controller, an overcurrent condition representative of a fault current in at least one of the at least one second-type ESD, the at least one electrical load device, and the at least one APLM;
    transmitting, with the desaturation controller coupled to a switching device coupled in series with the at least one second-type ESD and the at least one APLM, a desaturation control signal to alternately open and close the switching device when the overcurrent condition is present and when the overcurrent condition is absent, respectively, to alternately electrically isolate and electrically couple, respectively, the at least one second-type ESD and the plurality of APLMs; and
    diverting, with a freewheel diode coupled in parallel with both of the at least one second-type ESD and the switching device, a flow of the fault current around both of the at least one second-type ESD and the switching device upon opening the switching device.

\* \* \* \* \*